Dec. 9, 1969
B. J. DAHLEM
3,482,462
ENDLESS SPRING BELT AND CONNECTOR
Filed July 17, 1968
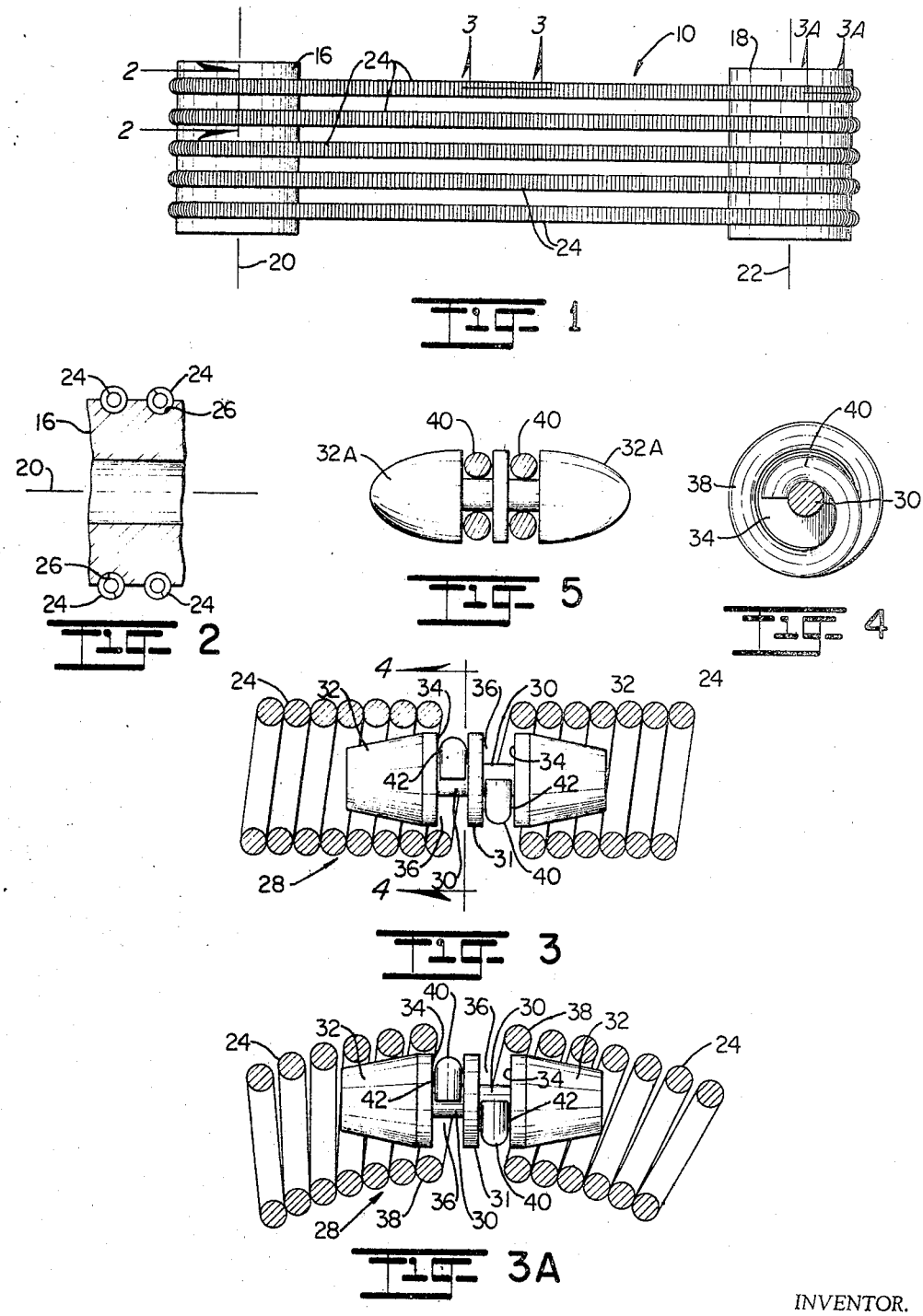
INVENTOR.
BILLY J. DAHLEM
BY
Sheridan and Ross
ATTORNEYS United States Patent Office 3,482,462
Patented Dec. 9, 1969

3,482,462
ENDLESS SPRING BELT AND CONNECTOR
Billy J. Dahlem, Golden, Colo., assignor to Power-Curve Conveyor Company, Denver, Colo., a corporation of Colorado
Filed July 17, 1968, Ser. No. 745,547
Int. Cl. F16g 1/18, 3/16
U.S. Cl. 74—238                                    6 Claims

ABSTRACT OF THE DISCLOSURE

A connector for joining the ends of a coil spring belt, characterized by a circular member having axially spaced annular grooves, each groove receiving an end coil of the coil spring when it is suitably deformed therein to form at least a portion of a convolution disposed within the groove. The member freely floats relative to the spring ends so that they may axially swivel relative to each other and also permits them to freely move in all lateral directions without imposing bending stresses on the spring to thus enable the belt to more readily conform to the curvation of a pulley over which it is trained.

Background of the invention

It has long been well known practice to form belts from helical close wound coil springs to thus utilize their inherent resilience, this being desirable in some instances where the center distance between supporting pulleys or rolls cannot be adjusted and in other instances where the pulley axes are angularly related and accommodate a plurality of adjacent belts, forming a conveyor surface which may move material around a curve. Patent No. 3,157,056 is exemplary of the multiple belt arrangement in a conveyor and to which art the present invention is related.

Theoretically, the ideal spring belt of uniform strength in all cross sections would be an endless helical coil of wire or one with ends welded or otherwise connected together to provide a joint of the same strength as the remaining coils. This theoretical ideal, however, would not be practical, even if feasible, since fatigue would still occur and the wire would still rupture at its weakest point. It has thus been desirable to connect the coil ends in various ways, not only for an original installation, but for repairing a ruptured belt to thus obtain further use of same.

Brief description of the drawing

FIGURE 1 is a fragmentary top plan of a conventional conveyor belt system;
FIGURE 2 is a section taken on line 2—2, FIGURE 1;
FIGURE 3 is an enlarged section taken on line 3—3, FIGURE 1;
FIGURE 3A is a like section taken on line 3A—3A, FIGURE 1;
FIGURE 4 is a section taken on line 4—4, FIGURE 3; and
FIGURE 5 is a side elevation of an alternative form of connector.

Description of the preferred embodiment

Referring now to the drawing, FIGURE 1 depicts a belt conveyor section 10 comprising a pair of spaced rolls 16, 18, the axes 20, 22 of which may be angularly adjusted, if desired, to adjust the direction of movement of material reposed upon a plurality of adjacent coil spring belts 24 which extend between the rolls and engage circumferential semi-circular grooves 26 in same, all of which is conventional in the conveyor art.

The connector which joins the ends of the coil spring belts comprises an elongated metallic member 28, all cross sections of which are circular. An axial shank 30 is provided with a central annular collar 31 and heads 32 at opposite ends which form annular abutments 34 at the outer ends of annular grooves 36. The heads taper inwardly toward their outer ends, illustrated as frusto-conical in shape, for a purpose to subsequently appear. As will be apparent, the connector may be manufactured as an automatic screw machine product, utilizing circular rod stock which is cut by suitable tools to form grooves 36, the heads being similarly formed and the member then cut off from the bar stock.

As best shown in FIGURE 4, a coil 38 at each end of belt 24 is deformed by a suitable tool into the shape of a general spiral of decreasing radius of curvature, terminating in a partial convolution 40 which is disposed in a groove 36, the lateral face 42 of such convolution abutting a corresponding annular surface which transmits tension to shank 30. The width of the groove is slightly in excess of the diameter of the wire and the width of the annular surface is preferably at least the diameter of the wire. The diameter of the shank should be at least sufficient to transmit the tension between the convolutions. Preferably it is somewhat stronger so that fatigue failure will occur in a convolution of the spring, rather than in the connector.

FIGURE 3 illustrates the position of parts along the straight run between rolls 16, 18. Frusto-conical heads 32 are now spaced from the inside envelope of the spring belt. When the belt passes around the rolls, however, as illustrated in FIGURE 3A, the clearance between a frusto-conical head and the envelope is decreased at one side of a diameter and increased at the opposite side. As will thus be apparent, the engagement between end convolutions and their cooperating annular abutments, provide universal joints at these points and obviate a stiff connection as would otherwise occur had the frusto-conical ends been cylindrical and tightly fitting the inside envelope of the belt.

FIGURE 5 illustrates an alternative form of connector in which heads 32A are ogival in shape, rather than frusto-conical, which permits the convolutions at the outermost radius of the belt, as it moves around a roll, to somewhat more readily conform to its curvature.

I claim:

1. In a belt of the type for use between a pair of spaced rolls, the belt being in the form of a coil spring having adjacent circular spiral convolutions, and a connector joining the ends of the coil spring, the improvements in combination, comprising:
   (a) said connector having a cylindrical shank disposed between axially spaced and confronting annular abutments,
   (b) the terminal convolution at each end of said spring being deformed into an inwardly directed curve to form at least a portion of a convolution surrounding said shank and abutting its corresponding annular abutment, whereby the annular abutments transmit tension in the spring through said shank.

2. Apparatus in accordance with claim 1 wherein each annular abutment is formed on the inner end of a circular head, disposed within convolutions of the spring adjacent at an end thereof, each head being so shaped relative to the cylindrical inner envelope of the spring to permit it to move in all lateral directions relative thereto, to thereby provide a universal joint connection between each of said annular abutments and said portion of a convolution abutting same.

3. Apparatus in accordance with claim 2 wherein each head is tapered inwardly in a direction toward its outer end.

4. Apparatus in accordance with claim 1 including an annular collar disposed on said shank midway between said confronting annular abutments, separating terminal ends of the spring.

5. A connector for joining ends of a coil spring having adjacent circular spiral convolutions, the terminal convolution at each end of which has been deformed into an inwardly directed curve to form at least a portion of a convolution having an opening of cross sectional area less than the cross sectional area of the inner envelope of the remainder of the coil spring, said connector comprising:
  (a) a cylindrical shank disposed between axially spaced confronting annular abutments and against each of which a said portion of a convolution is adapted to abut,
  (b) each annular abutment being formed on the inner end of a circular head proportioned to be disposed within convolutions of the spring adjacent an end thereof, each head being so shaped relative to the cylindrical inner envelope of the spring to permit it to move in all lateral directions relative thereto, to thereby provide a universal joint connection between each of said annular abutments and a said portion of convolution abutting same.

6. A connector in accordance with claim 5 including an annular collar disposed on said shank midway between said confronting annular abutments adapted to separate terminal ends of the spring.

References Cited

UNITED STATES PATENTS

| | | | |
|---|---|---|---|
| 1,613,193 | 1/1927 | Rankin | 74—238 |
| 2,797,937 | 7/1957 | Frishof. | |
| 3,157,056 | 11/1964 | Gray et al. | 74—238 |

FRED C. MATTERN, Jr., Primary Examiner

JAMES A. WONG, Assistant Examiner

U.S. Cl. X.R.

267—1